(12) United States Patent
Sheng et al.

(10) Patent No.: US 10,657,158 B2
(45) Date of Patent: May 19, 2020

(54) TEMPLATE-BASED STRUCTURED DOCUMENT CLASSIFICATION AND EXTRACTION

(71) Applicant: Google Inc., Mountain View, CA (US)

(72) Inventors: Ying Sheng, Sunnyvale, CA (US); Yifeng Lu, Mountain View, CA (US); Jing Xie, San Jose, CA (US); Jie Yang, Sunnyvale, CA (US); Luis Garcia Pueyo, Mountain View, CA (US); Jinan Lou, Cupertino, CA (US); James Wendt, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 760 days.

(21) Appl. No.: 15/360,939

(22) Filed: Nov. 23, 2016

(65) Prior Publication Data
US 2018/0144042 A1    May 24, 2018

(51) Int. Cl.
*G06F 16/00* (2019.01)
*G06F 16/28* (2019.01)
*G06N 20/00* (2019.01)
*G06F 16/93* (2019.01)
*G06Q 10/10* (2012.01)
*G06N 20/20* (2019.01)
*G06F 40/174* (2020.01)
*G06F 40/186* (2020.01)

(52) U.S. Cl.
CPC ............ *G06F 16/285* (2019.01); *G06F 16/93* (2019.01); *G06F 40/174* (2020.01); *G06F 40/186* (2020.01); *G06N 20/00* (2019.01); *G06N 20/20* (2019.01); *G06Q 10/10* (2013.01)

(58) Field of Classification Search
CPC ...... G06F 16/285; G06F 16/93; G06F 17/243; G06F 17/248; G06N 20/00; G06N 20/20; G06Q 10/10
See application file for complete search history.

(56) References Cited

U.S. PATENT DOCUMENTS

9,516,053 B1 * 12/2016 Muddu .................. G06F 16/254
9,525,606 B1 * 12/2016 Staggs .................. H04L 43/067
(Continued)

*Primary Examiner* — Shew Fen Lin
(74) *Attorney, Agent, or Firm* — Middleton Reutlinger (57) ABSTRACT

Techniques are described herein for automatically generating data extraction templates for structured documents (e.g., B2C emails, invoices, bills, invitations, etc.), and for assigning classifications to those data extraction templates to streamline data extraction from subsequent structured documents. In various implementations, a data extraction template generated from a cluster of structured documents that share fixed content may be identified. Features of the cluster of structured documents may be applied as input to extraction machine learning model(s) trained to provide location(s) of transient field(s) in structured documents, to determine location(s) of transient field(s) in the cluster of structured documents. An association between the data extraction template and the determined transient field location(s) may be stored. Based on the association, data point(s) may be extracted from a given structured document of a user that shares fixed content with the cluster of structured documents. The extracted data point(s) may be surfaced to the user.

18 Claims, 7 Drawing Sheets

(56) References Cited

U.S. PATENT DOCUMENTS

| | | | | |
|---|---|---|---|---|
| 10,366,053 B1* | 7/2019 | Zheng | .................... | G06N 20/00 |
| 2007/0282824 A1* | 12/2007 | Ellingsworth | ........ | G06F 16/313 |
| 2011/0213742 A1* | 9/2011 | Lemmond | ........... | G06F 16/3344 |
| | | | | 706/13 |
| 2015/0379072 A1* | 12/2015 | Dirac | .................... | G06N 20/00 |
| | | | | 707/693 |
| 2015/0379423 A1* | 12/2015 | Dirac | .................... | G06N 20/00 |
| | | | | 706/12 |
| 2015/0379424 A1* | 12/2015 | Dirac | .................... | G06N 20/00 |
| | | | | 706/12 |
| 2015/0379425 A1* | 12/2015 | Dirac | .................... | G06N 20/00 |
| | | | | 706/12 |
| 2015/0379426 A1* | 12/2015 | Steele | .................... | G06N 20/00 |
| | | | | 706/12 |
| 2015/0379427 A1* | 12/2015 | Dirac | .................... | G06N 20/00 |
| | | | | 706/12 |
| 2016/0078361 A1* | 3/2016 | Brueckner | .............. | H04L 67/10 |
| | | | | 706/12 |
| 2016/0314182 A1* | 10/2016 | Zhang | .................... | H04L 43/04 |

* cited by examiner

TEMPLATE-BASED STRUCTURED DOCUMENT CLASSIFICATION AND EXTRACTION

BACKGROUND

Users may be inundated with numerous business-to-consumer ("B2C") emails and similar communications that inform the user of a variety of information, such as travel itineraries, bills due, upcoming events, and so forth. If the user fails to set reminders, create calendar entries, or take other similar actions in response to receiving such communications, the user may, for instance, miss a meeting, fail to pay a bill, miss a flight, and so forth. Additionally, various data points in the communications that may be immediately relevant to a user, such as information related to an upcoming or current trip (e.g., flight information, hotel reservation, event/venue information, etc.), may be scattered across multiple different communications, and may be difficult for the user to track down.

Data contained in B2C communications and other similar documents (more generally referred to herein as "structured documents") may often follow more structured patterns than person-to-person communications, and often are created automatically using templates. Such templates may be useful for extracting pertinent data points, such as departure time, event location, invoice due dates, etc. However, these templates are not typically made available to entities interested in extracting data from these communications. It may be possible to reverse engineer these templates, e.g., using various parsers and/or heuristics that may require some level of human intervention, in order to generate data extraction templates configured to extract relevant data points for presentation to the user. However, given the ever-changing content and layout of B2C communications, reverse engineering data extraction templates manually may become impractical.

SUMMARY

The present disclosure is generally directed to methods, apparatus and computer-readable media (transitory and non-transitory) for automatically generating data extraction templates for structured documents (e.g., B2C emails, invoices, bills, invitations, etc.), and for assigning classifications to those data extraction templates to streamline data extraction from subsequent structured documents. For example, in some embodiments, a cluster of structured documents that share at least some fixed content may be used to generate a data extraction template (also referred to herein as a "structured document template"). The cluster of documents may then be classified into one or more of a plurality of enumerated categories (sometimes referred to as "verticals"), such as "travel," "events," "bills," etc. Additionally or alternatively, one or more transient field locations (e.g., XPaths) within the cluster of documents may be classified as providing particular data points for extraction (e.g., "departure date," "departure airport," "event location," invoice due date," etc.). As used herein, a "transient" field is a location within a cluster of structured documents that does not contain fixed content, instead containing content that is typically directed to a particular user (e.g., price, departure data, invoice number, etc.). The classified category(s) and transient field location(s) may then be associated with the data extraction template, e.g., as annotations of the template, data stored within the template, etc.

When subsequent structured documents (e.g., incoming B2C emails) match the data extraction template (e.g., share at least some fixed content with the underlying cluster of structured documents), the data extraction template, and more particularly, the associated classified category(s)/transient field location(s), may be used to quickly extract data points of interest from the subsequent structured document. In various embodiments, these extracted data points may be "surfaced" to a user in various ways that may depend, for instance, on the classified category of the data extraction template and/or semantic classifications(s) associated with the classified transient field location(s). For example, event data points (e.g., location, start time) may be inserted into a user's calendar, provided to the user as a notification (e.g., a "card") on a mobile device, used to remind the user that it is time to leave for the event, and so forth. Flight-related data points may be used to notify a user of a gate associated with a scheduled flight, to notify the user of any delays, and so forth.

In some embodiments, various machine learning techniques may be used to determine categories and/or transient field locations of data points of interest for data extraction templates. For example, one or more so-called "category" machine learning models may be trained, e.g., using a corpus of labeled structured documents, to classify structured documents into one or more of a plurality of document categories (or "verticals"). Additionally, one or more so-called "extraction" machine learning models may be trained, e.g., using a corpus of labeled structured documents, to provide one or more locations of one or more transient fields in structured documents.

To classify a particular data extraction template, in some embodiments, features of a cluster of structured documents underlying the data extraction template may be applied as input to one or more category machine learning models. Based on output of the one or more category machine learning models, a document category (or "vertical") associated with the data extraction template may be determined. In some embodiments, a count or frequency of structured documents of the cluster that fall into a particular category must satisfy a threshold in order for the data extraction template to be classified within the particular category. For example, 90% of the cluster's structured documents may be required to be classified as being in a particular vertical, or else an association between the data extraction template and the vertical may not be stored in memory.

In some embodiments, after a document category (or vertical) of a data extraction template is determined, one or more extraction machine learning models may then be selected from a plurality of extraction machine learning models based on the determined document category. For example, if a cluster/template is classified as "flight," extraction templates configured to identify transient field locations within B2C communications of "departure time," "flight number," "departure city," "arrival time," and/or "arrival city" may be selected. Features of the cluster of structured documents underlying the data extraction template may then be applied as input to the one or more selected extraction machine learning models. Based on output of the one or more extraction machine learning models, one or more locations of one or more transient fields in the cluster of structured documents may be determined. In some embodiments, a particular transient field location must be identified in a threshold number (e.g., 90%, 80%, etc.) of the cluster's structured documents as containing a particular value in order for an association to be created between the data extraction template and the particular transient field location.

Once associations between the data extraction template and one or more categories/transient field locations are stored (e.g., as annotations of the template, or separately in a database), the data extraction template may be used to quickly extract pertinent information from subsequent structured documents. For example, in some embodiments, a subsequent structured document such as an incoming B2C email may be matched to the template, e.g., by virtue of the subsequent structured document sharing fixed content with the template, or by having the same/similar sender/subject/metadata. Then, at least one data point may be extracted from the subsequent structured document based on a previously-determined association between the data extraction template and one or more transient field locations. For example, the data extraction template may include one or more annotations indicating that an "event location" is located at a first XPath, an "event start time" is located at a second XPath, and an "event title" is located at a third XPath. These annotations may be used to extract the data located at the designated XPaths. The extracted data points may then be surfaced to the user as described previously.

In some implementations, a computer implemented method may be provided that includes: identifying a data extraction template generated from a cluster of structured documents that share at least some fixed content; applying features of the cluster of structured documents as input to one or more extraction machine learning models, wherein the one or more extraction machine learning models are trained to provide one or more locations of one or more transient fields in structured documents; determining one or more locations of one or more transient fields in the cluster of structured documents based on output generated from the one or more extraction machine learning models based on the input provided to the one or more extraction machine learning models; storing, in computer memory, a first association between the data extraction template and the determined one or more transient field locations in the cluster of structured documents; extracting at least one data point from a given structured document of a user that shares at least some fixed content with the cluster of structured documents, wherein the extracting is based on the first association; and providing the extracted data point for surfacing to the user via one or more computing devices operated by the user.

In various implementations, the method may further include: applying the same features or different features of the cluster of structured documents as input to one or more category machine learning models, wherein the one or more category machine learning models are trained to classify structured documents into one or more of a plurality of document categories; and determining a document category associated with the data extraction template based on output generated over the one or more category machine learning models based on the input provided to the one or more category machine learning models. In various implementations, the one or more extraction machine learning models may be selected from a plurality of extraction machine learning models based on the determined document category.

In various implementations, the extracted data point may be surfaced to the user in a manner that is selected based on the determined document category. In various implementations, the method may further include storing, in the computer memory, a second association between the data extraction template and the determined document category. In various implementations, the second association may be stored in response to a determination that a count of structured documents in the cluster that were classified into the document category satisfy a threshold.

In various implementations, the one or more transient field locations may include at least one XPath. In various implementations, the one or more extraction machine learning models may be further trained to provide, in association with the one or more transient field locations, one or more semantic classifications. In various implementations, the first association may further include an association between the data extraction template and one or more semantic classifications. In various implementations, the extracted data point may be surfaced to the user in a manner that is selected based on a semantic classification of the one or more semantic classifications that is associated with a transient field location of the one or more transient field locations that contained the extracted data point.

In various implementations, the first association may be stored in response to a determination that a count of structured documents in the cluster for which a particular transient field location is provided by the one or more extraction machine learning models satisfies a threshold.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
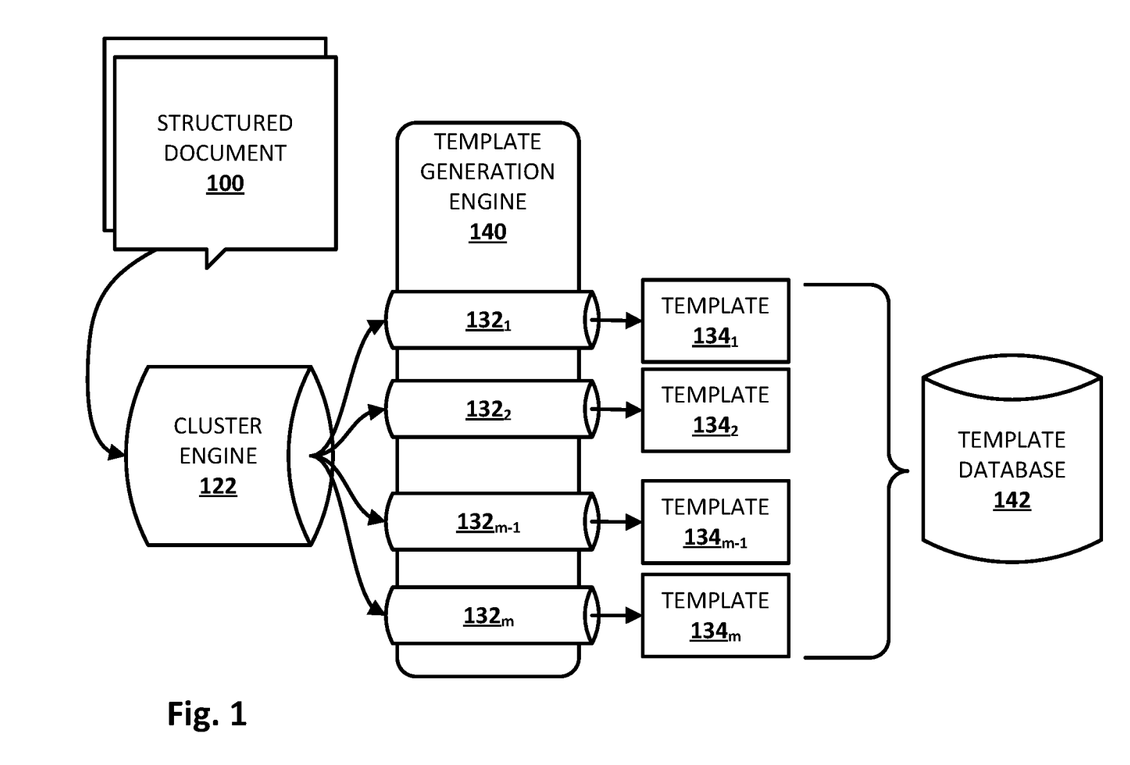
FIG. 1 illustrates an example of how a corpus of structured documents may be analyzed by various components of the present disclosure to generate one or more data extraction templates.

FIG. 1 illustrates an example environment in which a corpus of structured documents 100 may be grouped into clusters $132_{1-m}$, and in which clusters containing structured documents may be analyzed to generate data extraction templates $134_{1-m}$. As used herein, a "structured document" may refer to B2C communications such as emails, text messages (e.g., SMS, MMS), instant messages, and any other B2C communications, that are typically (but not always) automatically generated, e.g., using a template. Additionally, in some implementations, structured documents may include other types of documents, such as letters (e.g., in portable document format ("PDF") and/or word processing format), invoices, bills, receipts, invitations (e.g., invites received via social network applications), or other structured documents that may or may not be considered correspondence and/or which may be attached to other correspondence (e.g., emails). In various implementations, structured documents may be structured using various markup languages such as the eXtensible Markup Language ("XML") or the Hypertext Markup Language ("HTML"), though this is not required. In various implementations, a structured document 100 may include various metadata. For instance, emails may include one or more sender identifiers (e.g., sender email addresses), one or more recipient identifiers (e.g., recipient email addresses, including cc'd and bcc'd recipients), a date sent, one or more attachments, a subject, and so forth.

In some implementations, a cluster engine 122 may be configured to group the corpus of structured documents 100 into a plurality of clusters $132_{1-m}$ based on one or more patterns (e.g., fixed content) shared among one or more structured documents 100 within the corpus. In some implementations, cluster engine 122 may have one or more preliminary filtering mechanisms to discard documents that are not suitable for template generation. For example, if a corpus of structured documents 100 under analysis includes personal emails and B2C emails, personal emails may be discarded.

Cluster engine 122 may utilize various aspects of structured documents 100 to group structured documents 100 into clusters. These aspects may include but are not limited to metadata, formatting information (e.g., HTML nodes, XPaths, etc.), textual similarities, byte similarities, and so forth. For example, in some implementations, B2C emails may be clustered by one or more of the following pieces of metadata: sender address, sender domain, subject (e.g., fixed content within the subject), date, and so forth.

Additionally or alternatively, structured documents 100 may be clustered based on underlying structural similarities. For example, a set of XPaths for an email (e.g., a set of addresses to reach each node in the email's HTML node tree) may be independent of the email's textual content. Thus, the similarity between two or more such emails may be determined based on a number of shared XPaths. An email may be assigned to a particular cluster based on the email sharing a greater number of XPaths with emails of that cluster than with emails of any other cluster. Additionally or alternatively, two email may be clustered together based on the number of XPaths they share compared to, for instance, a total number of XPaths in both emails.

In some implementations, structured documents 100 may additionally or alternatively be grouped into clusters based on textual similarities. For example, emails may be analyzed to determine shared terms, phrases, n-grams, n-grams plus frequencies, and so forth. Based on these data points, emails may be clustered. For example, emails sharing a particular number of shared phrases and n-grams (e.g., fixed content) may be clustered together.

In some implementations, structured documents may be grouped into clusters based on byte similarity. For instance, structured documents may be viewed as strings of bytes that may include one or both of structure (e.g., metadata, XPaths) and textual content. In some implementations, a weighted combination of two or more of the above-described techniques may be used as well. For example, both structural and textual similarity may be considered, with a heavier emphasis on one or the other.

Once corpus of structured documents 100 are grouped into clusters $132_{1-m}$, some clusters may contain structured documents that are highly likely to include the same fixed content (e.g., "boilerplate") and structure, and to have transient data fields (which may be the primary data of interest for extraction) in the same or similar locations (e.g., spatially and/or in terms of the same XPath). Template generation engine 140 may be configured to generate one or more data extraction templates $134_{1-m}$. Further processing may be performed on data extraction templates $134_{1-m}$ to make them usable by various components to extract, from one or more structured communications, one or more pieces of information associated with transient (and in some cases, non-confidential) structural paths. In various implementations, template generation engine 140 may store templates $134_{1-m}$ in a template database 142.

Figure 2:
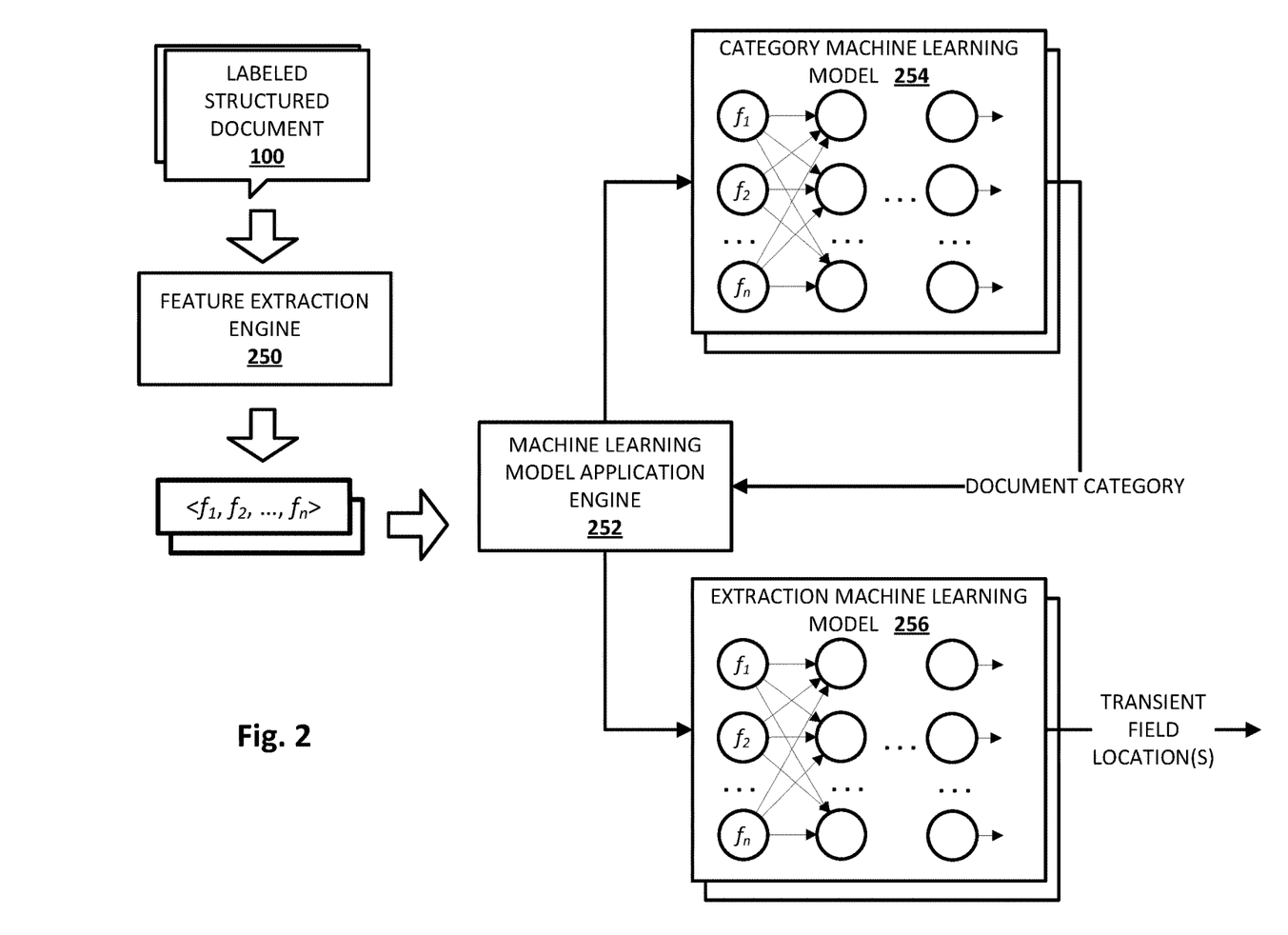
FIG. 2 illustrates an example of how category and extraction machine learning models may be trained, in accordance with various implementations.

FIG. 2 depicts an example of how one or more machine learning models may be trained to classify structured documents into various categories (or "verticals"), as well as how one or more machine learning models may be trained to classify locations within documents as transient fields. A corpus of labeled structured documents 200 may be provided as training data. In some implementations, each labeled structured document 200 may be labeled (e.g., annotated) with various classifications, such as category (or vertical), and one or more locations of one or more transient fields. In some implementations, each transient field location may be annotated or otherwise indicated with a semantic meaning, such as "departure/arrival date," "departure/arrival time," "departure/arrival city," "confirmation number," "event location," "event time," "event title," "invoice due date," "order number," "tracking number," "total purchase price," "delivery date," and so forth.

A feature extraction engine 250 may operate, for instance, on one or more computing systems connected by one or more networks. Feature extraction engine 250 may be configured to extract various features (e.g., metadata, n-grams, phrases, fixed content, etc.) from labeled structured documents 200. In some implementations, feature extraction engine 250 may provide feature vectors $<f_1, f_2, \ldots, f_n>$ containing features extracted from structured documents to a machine learning application engine 252.

Machine learning application engine 252 may be configured to apply, as labeled training data, features of each feature vector as input to one or more category machine learning models 254. Based on this training data, each category machine learning model 254 may be trained to classify structured documents into one or more of a plurality of document categories (or "verticals"). In some implementations, these verticals may include but are not limited to one or more of the following: "bill," "car rental," "event," "finance," "flight," "hotel," "membership," "offer," "purchase," "reminder," "rental," "restaurant," "social network," "transportation," and so forth. Of course, other categories are possible.

Machine learning application engine 252 may be further configured to apply, as labeled training data, features of each feature vector as input to one or more extraction machine learning models 256. Based on this training data, each extraction machine learning model 256 may be trained to provide (e.g., classify) one or more locations of one or more transient fields in structured documents. For example, each transient field location (e.g., XPath) in a structured document that contains transient data of interest may be labeled, annotated, or otherwise indicated.

As indicated by the arrow from category machine learning model 254 to machine learning application engine 252, in some implementations, machine learning application engine 252 may select one or more extraction machine learning models 256 to use for a particular labeled structured document based on a document category provided by category machine learning model 254 in response to the same particular structured document. For example, if a structured document is labeled or classified as an "event," machine learning application engine 252 may apply only those extraction machine learning models 256 that are applicable to events. For example, machine learning application engine 252 may select and apply an "event title" extraction machine learning model 256—which may be configured to identify a location (e.g., XPath) within the structured document as containing transient data corresponding to an event title—to the particular structured document. Similarly, machine learning application engine 252 may select and apply "event start time" and "event end time" extraction machine learning models 256.

In the figures, the one or more category machine learning models 254 and extraction machine learning models 256 are depicted as artificial neural networks with n inputs $f_{1-n}$ and a corresponding number of outputs. However, this is not meant to be limiting. Other types of machine learning models, such as linear regression models and other similar models, may applied in addition to or instead of neural networks. Moreover, while multiple category machine learning models 254 and extraction machine learning models 256 are depicted, in some embodiments, a single machine learning model may be used for categorization, and another single machine learning model (or the same model for both categories and extraction) may be used for extraction. Moreover, in some implementations, category machine learning model(s) 256 may be omitted. In some such implementations, one or more semantic classifications associated with transient field locations may be used to determine how a particular extracted data point is to be surfaced to a user, as will be described below.

Once one or more category machine learning models 254 and/or extraction machine learning models 256 are trained, they may be used to create associations between data extraction templates (e.g., created as shown in FIG. 1) and various categories and/or transient field locations. For example, each data extraction template 134 may be annotated with a category (or more than one category in some implementations) and one or more transient field locations.

Figure 3:
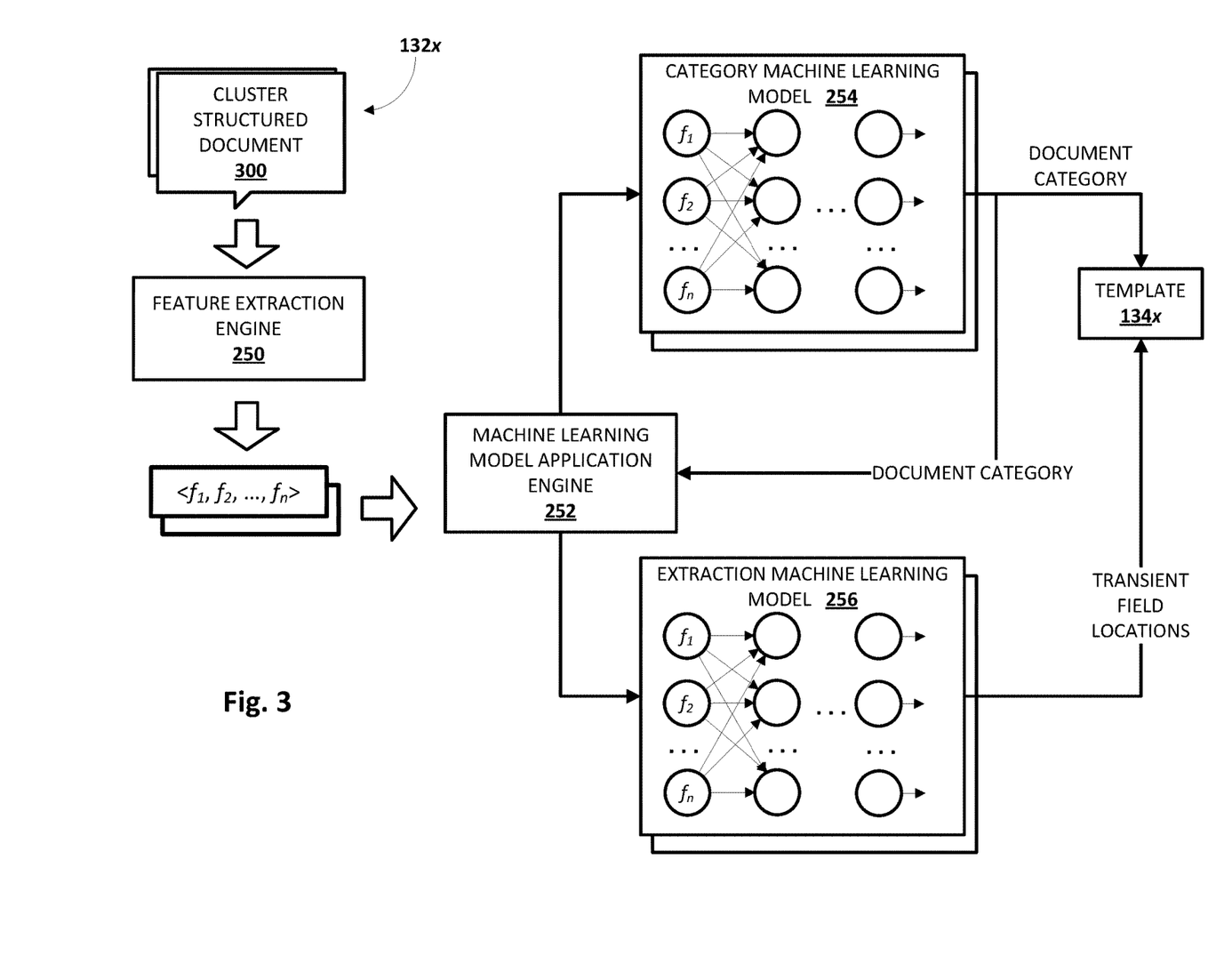
FIG. 3 depicts an example of how associations between data extraction templates and categories and/or transient field locations identified from structured documents used to generate the data extraction templates may be generated, in accordance with various implementations.

Referring now to FIG. 3, many of the same components are depicted as were depicted in FIG. 2, and thus are numbered similarly. A cluster $132_x$ of structured documents 300 associated with (e.g., used to generate, sharing fixed content with, etc.) a given data extraction template $134_x$ are provided as input to feature extraction engine 250. Feature extraction engine 250 may extract various features $<f_1, f_2, \ldots, f_n>$ from each structured document 300 of cluster $132_x$ and may provide those features to machine learning application engine 252. Machine learning application engine 252 may apply the features to one or more category machine learning models 254. In some implementations, each category machine learning model 254 may be trained as described above to determine whether a structured document 300 should be classified into a particular category. If, for instance, a threshold number (e.g., 90%, or some other threshold) of structured documents 300 of cluster $132_x$ are classified into a particular category, then an association between template $134_x$ and the threshold-satisfying category may be stored, e.g., as an annotation of template $134_x$ and/or in template database 142.

Additionally, machine learning application engine 252 may apply the extracted features $<f_1, f_2, \ldots, f_n>$ to one or more extraction machine learning models 256. In some implementations, each extraction machine learning model 256 may be trained as described above to locate transient fields within each structured document 300. If, for instance, a threshold number (e.g., 90%, or some other threshold) of structured documents 300 of cluster $132_x$ are classified as having a particular transient field (e.g., event location, departure city, etc.) in a particular location (e.g., XPath), then an association between template $134_x$ and the threshold-satisfying transient field location may be stored, e.g., as an annotation of template $134_k$ and/or in template database 142.

Suppose the following input is applied to an extraction machine learning model 256 configured to locate an event start time:

```
Example input vertical: Event
Example input field: start_timestring
Example input email:
<p>Dear John,</p>
<p>Your meeting is today at 9:00am</p>
<p>The meeting will end at 3:00pm</p>
<p>Thank you</p>
```

The extraction machine learning model 256 may, in some implementations, provide output such as the following:

```
1.0 -> <p>Your meeting is today at 9:00am</p>
0.5 -> <p>The meeting will end at 3:00pm</p>
0.0 -> <p>Dear John,</p>
0.0 -> <p>Thank you</p>
```

This output indicates a high probability (1.0) that the first transient field contains the event start time, a lower probability (0.5) that the second transient field contains the event start time, and very low probabilities that the third and fourth transient fields contain the event start time. In this example, it is clear that the first field contains the event start time. However, in other situations, the probabilities may be more granular and/or less certain. Accordingly, in various implementations, a threshold (e.g., 0.9, 85%, etc.) may be selected so that transient field locations having probabilities below the threshold are not identified conclusively as containing a particular piece of data.

As noted above, in some implementations, only those extraction machine learning models 256 associated with a threshold-satisfying category (e.g., determined by category machine learning model 254) may be applied to each structured document 300 of cluster $132_x$. Compared to simply applying all extraction machine learning models 256 to each structured document 300, this may conserve computing resources such as processing cycles, memory, and/or network bandwidth.

Figure 4:
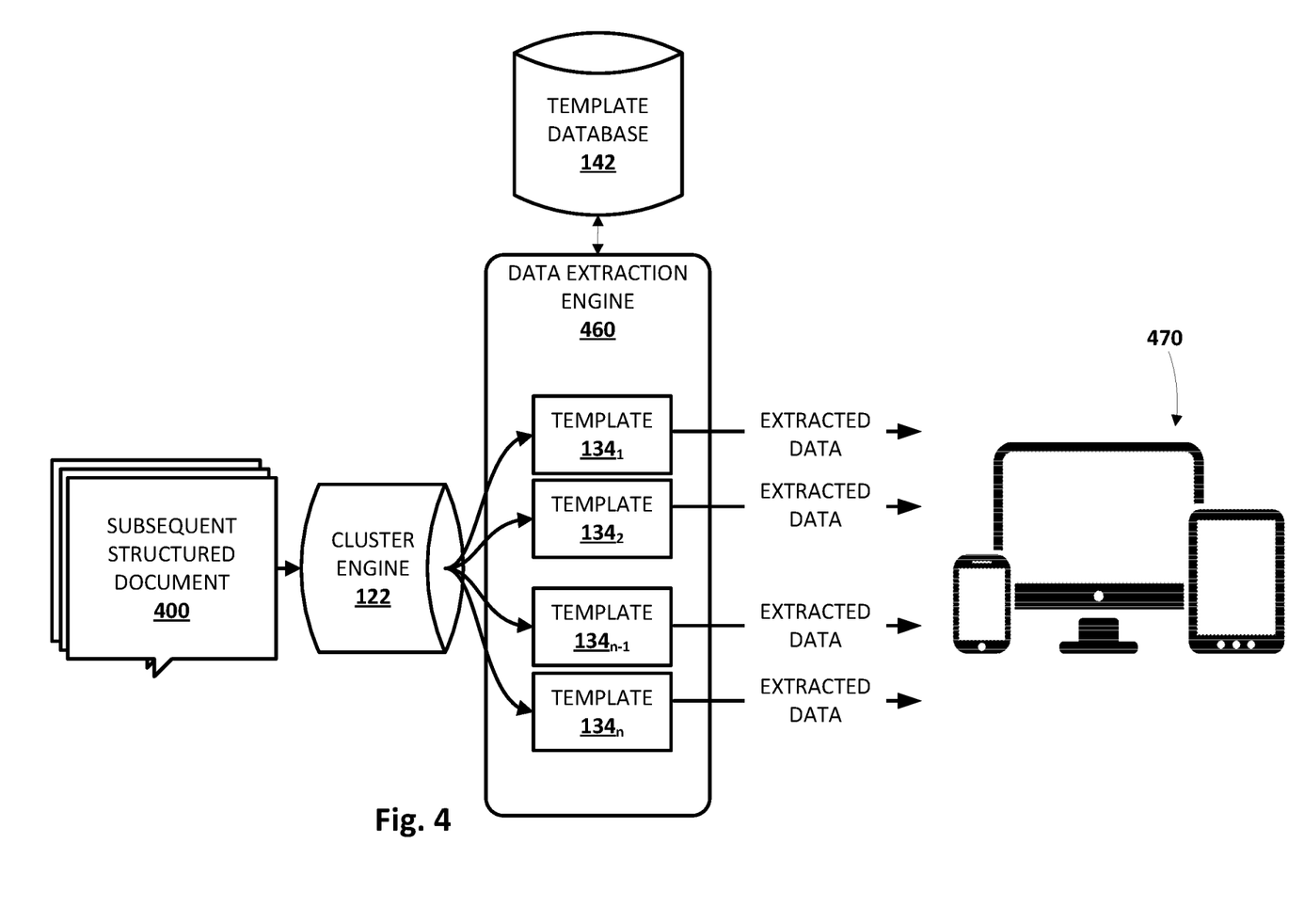
FIG. 4 depicts an example of how data extraction templates may be used to extract data points from subsequent structured documents, in accordance with various implementations.

Once data extraction templates 134 are annotated or otherwise associated with document categories and/or transient field locations, the data extraction templates 134 may be used to extract pertinent data points from subsequent structured communications. Referring now to FIG. 4, subsequent structured documents 400 (e.g., B2C emails, invoices, invitations, etc.) may be provided to cluster engine 122. Cluster engine 122 may analyze subsequent structured documents 400 to identify which data extraction templates 134 correspond (e.g., match, share fixed content with, etc.) to each subsequent structured document 400, e.g., using similar techniques as were described above with respect to FIG. 1 to organize structured documents 100 into clusters 132. In some implementations, cluster engine 122 may work in conjunction with a data extraction engine 460, which may have access to templates 134 via template database 142, to identify which data extraction template corresponds to a particular subsequent structured document 400.

Data extraction engine 460 may extract data points from subsequent structured documents 400 in accordance with associations between data extraction templates 134 and document categories and/or transient field locations. Suppose a particular data extraction template 134 is annotated as having a category of "event," and annotations associated with the data extraction template 134 identify transient field locations (e.g., XPaths) for "event title," "event location," "event start time," and "event end time." The data points contained at the identified locations within a subsequent structured document 400 that matches the particular data extraction template 134 may be extracted and provided to one or more client devices 470 operated by a user (e.g., as part of an "ecosystem" of devices operated by the user) associated with the structured document 400 (e.g., a recipient of a B2C email).

In some implementations, data extraction engine 460 may annotate the extracted data to inform one or more client devices 470 of a manner in which the extracted data should be surfaced (e.g., presented, output, etc.) to a user. For example, if the subsequent structured document 400 pertained to an event, then extracted data points (e.g., event title, event start time, event end time, event location) may be used to create a calendar entry in a calendar associated with the user. Additionally or alternatively, the extracted data points may be presented to the user, e.g., as a "card," pop up notification, text message, etc.

In some implementations, the extracted data points may be presented to the user by one or more client devices 470 at a selected time. Suppose the subsequent structured document 400 was a B2C email containing a flight itinerary. At some point in time prior to the first flight (e.g., which may be determined, for instance, based on a projected travel time of the user to the departure airport), the user may be presented with a "card" or other notification indicating that it is time for the user to leave for the airport.

The manner in which extracted data points are surface to a user may, in some implementations, depend on a document category associated with a data extraction template 134 used to extract the data points. For example, if a subsequent structured document 400 matches a data extraction template 134 associated with car rental from a particular company, then the user may be presented with a card or other selectable graphical element that includes a link to a maps application. In some implementations, the maps application may be prepopulated with data about a location of the car rental company, e.g., so that the user can quickly get directions to pick up or drop off a vehicle. In other implementations, the extracted data points may be surfaced to the user in a manner that is selected based on one or more semantic classifications associated with one or more transient field locations that contain extracted data points (e.g., without consideration of a document category). For example, if the extracted data points include data extracted from transient field locations indicated to include a departure airport, an arrival airport, a flight number, a departure time, and/or other data pertinent to a flight, then the extracted data points may be surfaced to the user in a manner that is suitable for presenting flight information.

Operations performed by cluster engine 122, template generation engine 140, feature extraction engine 250, machine learning application engine 252, data extraction engine 460, and/or one or more client devices 470 may be performed on individual computer systems, distributed across multiple computer systems, or any combination of the two. These one or more computer systems may be in communication with each other and other computer systems over one or more networks (not depicted).

Figure 5:
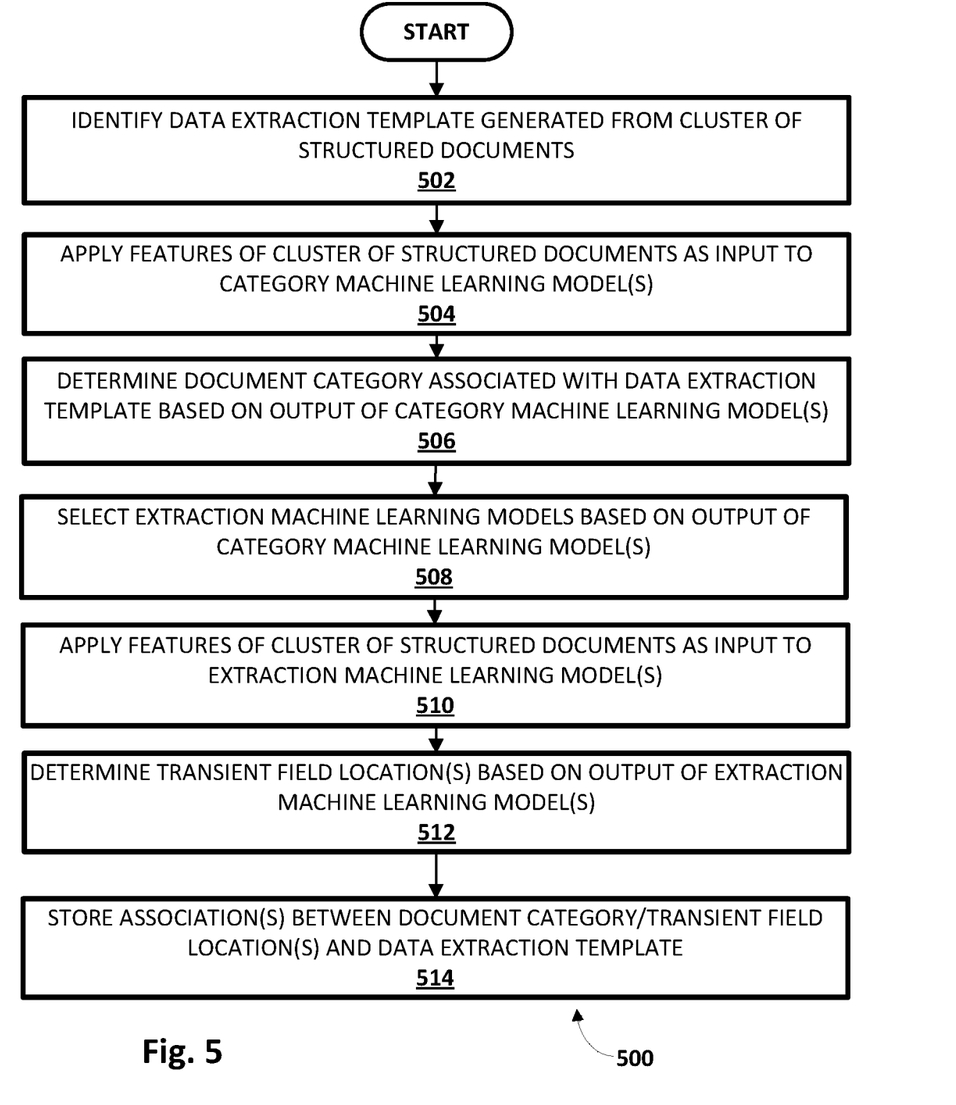
FIG. 5 depicts a flow chart illustrating an example method of generating associations between data extraction templates and categories and/or transient field locations identified from structured documents used to generate the data extraction templates, in accordance with various implementations.

Referring now to FIG. 5, an example method 500 is depicted for automatically generating data extraction templates for structured documents (e.g., B2C emails), and for assigning classifications to those data extraction templates to streamline data extraction from subsequent structured documents. For convenience, the operations of the flow chart in FIG. 5 (and in FIG. 6) are described with reference to a system that performs the operations. This system may include various components of various computer systems. Moreover, while operations of method 500 are shown in a particular order, this is not meant to be limiting. One or more operations may be reordered, omitted or added.

At block 502, the system may identify, e.g., from data extraction template database 142, a data extraction template generated from a cluster of structured documents that share at least some fixed content (e.g., boilerplate). FIG. 1 demonstrated one example of how structured documents may be clustered and data extraction templates generated from clusters of structured documents.

At block 504, the system may apply features of the cluster of structured documents used to generate the data extraction template (or other structured documents that simply match the template) as input to one or more category machine learning models 254. As noted above, in some embodiments, a single category machine learning model 254 may be trained to classify structured documents into one or more of a plurality of document categories. In other implementations, multiple category machine learning models 254 may be employed, each trained to classify structured documents into a particular category (e.g., with a measure of confidence).

At block 506, a document category associated with the data extraction template may be determined based on output of the one or more category machine learning models 254. For example, one category machine learning model 254 associated with a particular document category (or "vertical") may categorize a large percentage (e.g., 95%, 0.95, etc.) of the structured documents of the cluster into its associated category. Other category machine learning models 254 may categorize lower percentages of structured documents of the cluster into their associated categories. In some implementations, the category associated with the category machine learning model 254 that classifies the highest percentage of structured documents of the cluster may be determined to be the document category to associate with the data extraction template. In some implementations, a threshold number or percentage (e.g., >80%) of the structured documents of the cluster must be classified within a particular category in order for the category to be determined as being associated with the data extraction template.

At block 508, the system may select one or more extraction machine learning models 256 based at least in part on output of the one or more category machine learning models 254. For example, if the data extraction template is determined to be associated with a category of "bill," then extraction machine learning models 256 associated with transient fields such as "due date," "amount due," "late charge," "billing entity," and so forth may be selected. If the data extraction template is determined to be associated with a category of "event," then extraction machine learning models 256 associated with transient fields such as "event location," "event start time," "event end time," and so forth, may be selected. Of course, in other implementations in which blocks 506-508 are omitted, all extraction machine learning models may be applied, or some subset selected based on, for instance, semantic classifications associated with transient field locations.

At block 510, the system may apply features of the cluster of structured documents used to generate the data extraction template as input to one or more of the extraction machine learning models 256 selected at block 508. As noted above, in some embodiments, a single extraction machine learning model 256 may be trained to classify locations within structured documents as containing one or more of a plurality of transient data fields. In other implementations, multiple extraction machine learning models 256 may be employed, each trained to classify a location within structured documents as containing one or more of a plurality of transient data fields.

At block 512, the system may determine transient field locations associated with the data extraction template based on output of the one or more extraction machine learning models 256. For example, it may be determined by one extraction machine learning model 256 that a "departure time" is associated with a first XPath, a "departure city" is associated with a second XPath is greater than a threshold number of documents of the cluster, and so forth. At block 514, associations between the document category determined at block 506, the transient field location(s) determined at block 512, and the data extraction template may be stored in memory, e.g., within data extraction template database 142. In some embodiments, one or more semantic classifications may be stored in association with the one or more transient field locations. These semantic classifications may in some implementations be trained into extraction machine learning models 256, e.g., as part of the labeled training data. In other implementations, semantic classifications associated with transient field locations may be determined using other signals, such as adjacent and/or nearby fixed text (e.g., "DEPARTURE DATE:", "INVOICE DUE:", "LOCATION:", etc.).

Figure 6:
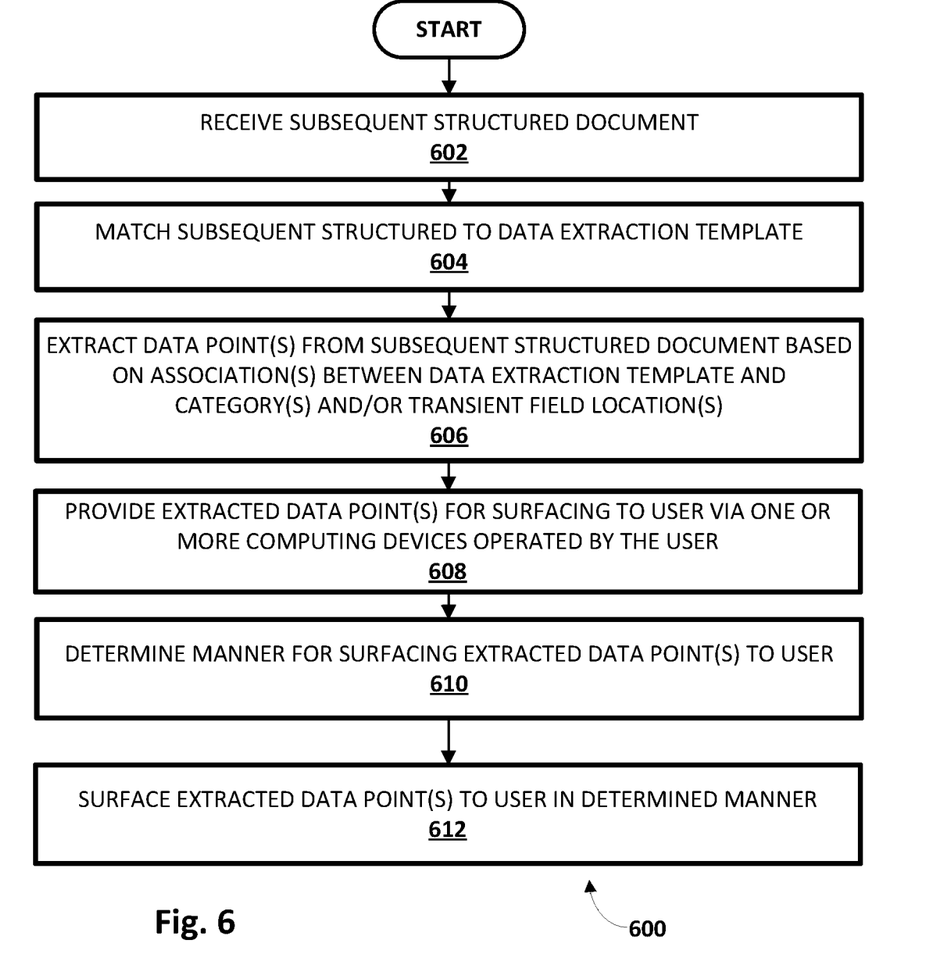
FIG. 6 depicts a flow chart illustrating an example method of applying data extraction templates to extract data points from subsequent structured communications, in accordance with various implementations.

FIG. 6 depicts a flow chart illustrating an example method of applying data extraction templates to extract data points from subsequent structured communications, in accordance with various implementations. At block 602, the system may receive a subsequent structured document, such as a B2C email addressed to a user, bill, invoice, invitation, etc. At block 604, the system (e.g., cluster engine 122) may match the subsequent structured communication to a data extraction template, e.g., using the techniques described above in association with cluster engine 122.

At block 606, the system may extract one or more data points from the subsequent structured communication based on one or more associations between the matched data extraction template and categories/transient field locations, e.g., which may be annotations of the template. At block 608, the extracted data point(s) may be provided, e.g., to a user client device (e.g., 470 in FIG. 4). In some embodiments, these data points may be annotated, e.g., with semantic classifications of the transient field locations and/or the category associated with the template, so that the client device may surface the extracted data points to the user in a sensible manner (e.g., add calendar entry, pop up notification or "card," etc.).

At block 610, the system (e.g., client device 470) may determine a manner for surfacing the extracted data points to the user. In some implementations this may be determined at the client device itself, e.g., based on signals such as past user interactions on one or more client devices with surfaced data points, user preferences, and so forth. In some implementations, this may be determined remotely from the client device, e.g., at data extraction engine 460, and may be communicated (e.g., as annotations of extracted data points) to the client device. At block 612, the extracted data points may be surfaced to the user in the manner determined at block 610, e.g., as a pop up window, text message, card, reminder, calendar entry, audible reminder (e.g., from a standalone voice-activated product), and so forth.

In various implementations, new structured documents generated from a heretofore unknown template may be distributed, e.g., as B2C emails to consumers. For example, a new company may begin sending B2C emails to users, and/or an airline or other entity may dramatically alter a format of its outgoing B2C emails. In such cases, category machine learning model(s) 254 and/or extraction machine learning model(s) 256 may receive additional training, e.g., using new training data that includes labeled structured documents (or in some cases, simply data extraction templates generated from clusters of structured documents). In this manner, B2C emails (and more generally, structured documents) having heretofore unknown formats may be assimilated into systems configured with selected aspects of the present disclosure. Consequently, subsequent emails matching the new formats may be recognized, and data points may be extracted using disclosed techniques.

Figure 7:
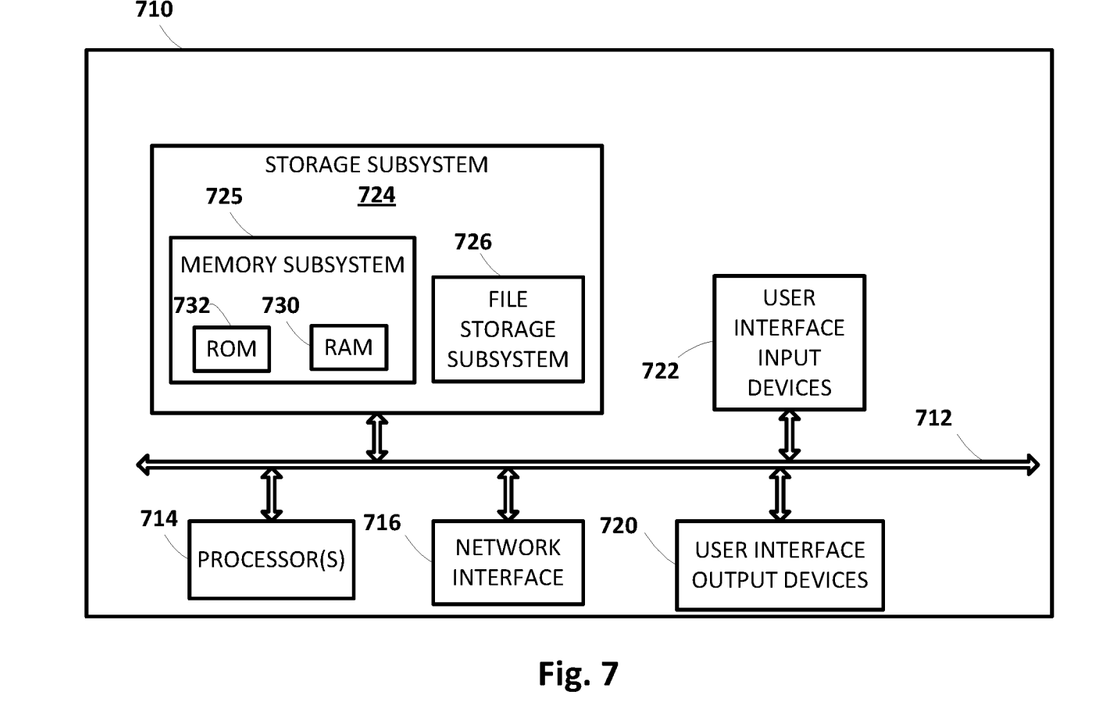
FIG. 7 schematically depicts an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of methods 500 and/or 600 and/or to implement one or more of cluster engine 122, template generation engine 140, and/or feature extraction engine 250, machine learning application engine 252, data extraction engine 460, and/or one or more client devices 470.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
    identifying a data extraction template generated from a cluster of electronic messages that share at least some underlying structural and textual similarities;
    applying features of the cluster of electronic messages as input to one or more category machine learning models, wherein the one or more category machine learning models are trained to classify electronic messages into one or more of a plurality of document categories;
    determining a document category associated with the data extraction template based on output generated over the one or more category machine learning models based on the input provided to the one or more category machine learning models;
    applying the same features or different features of the cluster of electronic messages as input to one or more extraction machine learning models, wherein the one or more extraction machine learning models are trained to provide one or more locations of one or more transient fields in electronic messages, and wherein the one or more extraction machine learning models are selected from a plurality of extraction machine learning models based on the determined document category;
    determining one or more locations of one or more transient fields in the cluster of electronic messages based on output generated from the one or more extraction machine learning models based on the input provided to the one or more extraction machine learning models;
    storing, in computer memory, a first association between the data extraction template and the determined one or more transient field locations in the cluster of electronic messages;
    extracting at least two data points from a given electronic message of a user that shares at least some structural and textual similarities with the cluster of electronic messages, wherein the extracting is based on the first association; and providing the at least two extracted data points for surfacing to the user via one or more computing devices operated by the user.

2. The method of claim 1, wherein the extracted data point is surfaced to the user in a manner that is selected based on the determined document category.

3. The method of claim 1, further comprising storing, in the computer memory, a second association between the data extraction template and the determined document category.

4. The method of claim 3, wherein the second association is stored in response to a determination that a count of electronic messages in the cluster that were classified into the document category satisfy a threshold.

5. The method of claim 1, wherein the electronic messages comprise emails, SMS messages, or MMS messages.

6. The method of claim 1, wherein the one or more extraction machine learning models are further trained to provide, in association with the one or more transient field locations, one or more semantic classifications, and wherein the first association further includes an association between the data extraction template and one or more semantic classifications.

7. The method of claim 6, wherein the extracted data point is surfaced to the user in a manner that is selected based on a semantic classification of the one or more semantic classifications that is associated with a transient field location of the one or more transient field locations that contained the extracted data point.

8. The method of claim 1, wherein the first association is stored in response to a determination that a count of electronic messages in the cluster for which a particular transient field location is provided by the one or more extraction machine learning models satisfies a threshold.

9. A system comprising one or more processors and memory operably coupled with the one or more processors, wherein the memory stores instructions that, in response to execution of the instructions by one or more processors, cause the one or more processors to:
identify a data extraction template generated from a cluster of electronic messages that share at least some underlying structural and textual similarities;
apply features of the cluster of electronic messages as input to one or more category machine learning models, wherein the one or more category machine learning models are trained to classify electronic messages into one or more of a plurality of document categories;
determine a document category associated with the data extraction template based on output generated over the one or more category machine learning models based on the input provided to the one or more category machine learning models;
apply the same features or different features of the cluster of electronic messages as input to one or more extraction machine learning models, wherein the one or more extraction machine learning models are trained to provide one or more locations of one or more transient fields in electronic messages, wherein the one or more extraction machine learning models are selected from a plurality of extraction machine learning models based on the determined document category;
determine one or more locations of one or more transient fields in the cluster of electronic messages based on output generated from the one or more extraction machine learning models based on the input provided to the one or more extraction machine learning models;
store, in the memory, a first association between the data extraction template and the determined one or more transient field locations in the cluster of electronic messages;
extract at least two data points from a given electronic message of a user that shares at least some structural and textual similarities with the cluster of electronic messages, wherein the extraction is based on the first association; and
provide the at least two extracted data points for surfacing to the user via one or more computing devices operated by the user.

10. The system of claim 9, wherein the extracted data point is surfaced to the user in a manner that is selected based on the determined document category.

11. The system of claim 9, further comprising instructions to store, in the computer memory, a second association between the data extraction template and the determined document category.

12. The system of claim 11, wherein the second association is stored in response to a determination that a count of electronic messages in the cluster that were classified into the document category satisfy a threshold.

13. The system of claim 9, wherein the electronic messages comprise emails, SMS messages, or MMS messages.

14. The system of claim 9, wherein the one or more extraction machine learning models are further trained to provide, in association with the one or more transient field locations, one or more semantic classifications, and wherein the first association further includes an association between the data extraction template and one or more semantic classifications.

15. The system of claim 14, wherein the extracted data point is surfaced to the user in a manner that is selected based on a semantic classification of the one or more semantic classifications that is associated with a transient field location of the one or more transient field locations that contained the extracted data point.

16. The system of claim 9, wherein the first association is stored in response to a determination that a count of electronic messages in the cluster for which a particular transient field location is provided by the one or more extraction machine learning models satisfies a threshold.

17. At least one non-transitory computer-readable medium comprising instructions that, in response to execution of the instructions by one or more processors, cause the one or more processors to perform the following operations:
identifying a data extraction template generated from a cluster of electronic messages that share at least some underlying structural and textual similarities;
applying features of the cluster of electronic messages as input to one or more category machine learning models, wherein the one or more category machine learning models are trained to classify electronic messages into one or more of a plurality of document categories; and
determining a document category associated with the data extraction template based on output generated over the one or more category machine learning models based on the input provided to the one or more category machine learning models;
applying features of the cluster of electronic messages as input to one or more extraction machine learning models, wherein the one or more extraction machine learning models are trained to provide one or more locations of one or more transient fields in electronic messages, wherein the one or more extraction machine learning models are selected from a plurality of extraction machine learning models based on the determined document category;

determining one or more locations of one or more transient fields in the cluster of electronic messages based on output generated from the one or more extraction machine learning models based on the input provided to the one or more extraction machine learning models;

storing, in computer memory, a first association between the data extraction template and the determined document category, and a second association between the data extraction template and the determined one or more transient field locations in the cluster of electronic messages;

extracting at least at least two data points from a given electronic message of a user that shares at least some structural and textual similarities with the cluster of electronic messages, wherein the extraction is based on the first and second associations; and providing the at least two extracted data points for surfacing to the user via one or more computing devices operated by the user.

18. The at least one non-transitory computer-readable medium of claim 17, wherein the extracted data point is surfaced to the user in a manner that is selected based on the determined document category.

* * * * *